(12) United States Patent
Kintscher et al.

(10) Patent No.: US 11,498,371 B2
(45) Date of Patent: Nov. 15, 2022

(54) TIRE DATA INFORMATION SYSTEM

(71) Applicant: The Goodyear Tire & Rubber Company, Akron, OH (US)

(72) Inventors: Nadine Marianne Kintscher, Trier (DE); Veronika Ondrikova, Gosseldange (LU); Jason Mark Middelberg, Luxembourg (LU); Kanwar Bharat Singh, Lorenztweiler (LU); Etienne Besnoin, Luxembourg (LU); Benoit Julien A. Debout, Bastogne (BE); Mike Klein, Bissen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 648 days.

(21) Appl. No.: 16/553,554

(22) Filed: Aug. 28, 2019

(65) Prior Publication Data

US 2020/0189327 A1 Jun. 18, 2020

Related U.S. Application Data

(60) Provisional application No. 62/778,344, filed on Dec. 12, 2018.

(51) Int. Cl.
*B60C 23/20* (2006.01)
*B60C 23/04* (2006.01)
(Continued)

(52) U.S. Cl.
CPC ........ *B60C 11/246* (2013.01); *B60C 23/0486* (2013.01); *B60C 23/20* (2013.01); *G07C 5/12* (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS 4,926,331 A 5/1990 Windle et al.
5,157,610 A 10/1992 Asano et al.
(Continued)

FOREIGN PATENT DOCUMENTS

DE 10201520622 A1 10/2016
DE 102021101595 A1 * 8/2021
(Continued)

OTHER PUBLICATIONS

EPO search report.

*Primary Examiner* — Andre J Allen
(74) *Attorney, Agent, or Firm* — Edward T. Kennedy

(57) ABSTRACT

A tire data information system includes at least one tire that supports a vehicle and a processor. At least one sensor is mounted on the tire and is in electronic communication with the processor. The sensor measures a temperature and a pressure of the tire. A memory for storing tire identification information is in electronic communication with the processor. A tire wear state estimator generates a wear state of the tire and is in electronic communication with the processor. A tire wear rate estimator generates a wear rate of the tire and is in electronic communication with the processor. An antenna transmits the temperature, pressure, identification information, wear state, and wear rate of the tire to a display device that is accessible to a user of the vehicle. The display device includes indicators for showing the temperature, pressure, identification information, wear state, and wear rate to the user.

20 Claims, 10 Drawing Sheets

(51) Int. Cl.
*B60C 11/24* (2006.01)
*G07C 5/12* (2006.01)

(58) Field of Classification Search
CPC . B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/044; B60C 23/00; B60C 23/008; B60C 23/0455; B60C 23/0454; B60C 23/0461; B60C 23/0483; B60C 23/0474; B60C 23/0415; B60C 23/0491; B60C 23/0489; B60C 25/002; B60C 29/064; B60C 23/00363; B60C 23/0471; B60C 11/0318; B60C 23/0459; B60C 23/0481; B60C 2019/005; B60C 23/002; B60C 23/042; B60C 2200/02; B60C 23/0422; B60C 23/0423; B60C 23/0466; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 32/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/00883; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06
USPC .................................................. 73/146–146.8
See application file for complete search history.

(56) References Cited

U.S. PATENT DOCUMENTS

| | | | |
|---|---|---|---|
| 5,400,018 | A | 3/1995 | Scholl et al. |
| 5,513,107 | A | 4/1996 | Gormley |
| 5,531,122 | A | 7/1996 | Chatham et al. |
| 6,087,930 | A | 7/2000 | Kulka et al. |
| 6,243,007 | B1 | 6/2001 | Mclaughlin et al. |
| 6,611,740 | B2 | 8/2003 | Lowrey et al. |

(56) References Cited

U.S. PATENT DOCUMENTS

| | | |
|---|---|---|
| 6,918,289 B2 | 7/2005 | Hayashi et al. |
| 6,966,220 B2 | 11/2005 | Yueh |
| 7,301,444 B2 | 11/2007 | Matsuura |
| 7,423,522 B2 | 9/2008 | O'Brien et al. |
| 7,630,802 B2 | 12/2009 | Breed |
| 7,737,835 B2 | 6/2010 | Kyllmann et al. |
| 8,106,758 B2 | 1/2012 | Loehndorf et al. |
| 8,886,395 B2 | 11/2014 | Singh et al. |
| 8,983,716 B2 | 3/2015 | Singh et al. |
| 8,983,749 B1 | 3/2015 | Singh |
| 9,248,709 B2 | 2/2016 | Darrer et al. |
| 9,259,976 B2 | 2/2016 | Singh et al. |
| 9,376,118 B2 | 6/2016 | Benedict et al. |
| 9,381,812 B2 | 7/2016 | Gilling |
| 9,428,013 B2 | 8/2016 | Singh et al. |
| 9,442,045 B2 | 9/2016 | Singh |
| 9,513,192 B2 | 12/2016 | Kretschmann et al. |
| 9,610,810 B1 | 4/2017 | Singh |
| 9,650,053 B2 | 5/2017 | Singh et al. |
| 9,663,115 B2 | 5/2017 | Singh |
| 9,719,886 B2 | 8/2017 | Luk et al. |
| 9,739,689 B2 | 8/2017 | Singh |
| 9,752,962 B2 | 9/2017 | Singh |
| 9,818,088 B2 | 11/2017 | Penilla et al. |
| 9,821,611 B2 | 11/2017 | Singh |
| 9,838,876 B2 | 12/2017 | Dinan |
| 9,855,947 B1 | 1/2018 | Penilla et al. |
| 9,873,293 B2 | 1/2018 | Singh et al. |
| 9,878,690 B2 | 1/2018 | Thompson et al. |
| 9,878,721 B2 | 1/2018 | Singh et al. |
| 10,603,962 B2 | 3/2020 | Singh |
| 2012/0029759 A1 | 2/2012 | Suh et al. |
| 2014/0114558 A1 | 4/2014 | Singh et al. |
| 2014/0278040 A1 | 9/2014 | Singh et al. |
| 2015/0040656 A1 | 2/2015 | Singh et al. |
| 2015/0057877 A1 | 2/2015 | Singh |
| 2015/0284006 A1 | 10/2015 | Singh |
| 2016/0129737 A1 | 5/2016 | Singh et al. |
| 2016/0146706 A1 | 5/2016 | Singh |
| 2018/0060742 A1 | 3/2018 | Penilla et al. |
| 2018/0154707 A1 | 6/2018 | Singh et al. |
| 2018/0272813 A1 | 9/2018 | Singh |
| 2019/0001757 A1 | 1/2019 | Singh |
| 2020/0189327 A1 | 6/2020 | Kintscher et al. |
| 2021/0300133 A1 * | 9/2021 | Tang .................... B60C 11/243 |
| 2021/0402829 A1 * | 12/2021 | Ishizaka ............. B60C 23/0488 |
| 2022/0016940 A1 * | 1/2022 | Sams ...................... H04W 4/44 |
| 2022/0101512 A1 * | 3/2022 | Grossman ............. G06T 7/0004 |

FOREIGN PATENT DOCUMENTS

| | | | |
|---|---|---|---|
| EP | 0937615 A2 | 8/1999 | |
| EP | 2813378 A1 | 12/2014 | |
| EP | 2927065 A1 | 10/2015 | |
| EP | 3028909 A1 | 6/2016 | |
| EP | 3210799 A1 * | 8/2017 | .......... B60C 11/246 |
| EP | 3330106 B1 | 1/2020 | |
| WO | WO2016198970 A1 | 12/2016 | |
| WO | WO-2021079838 A1 * | 4/2021 | |

* cited by examiner

FIG. 7c

TIRE DATA INFORMATION SYSTEM

FIELD OF THE INVENTION

The invention relates generally to tire monitoring systems. More particularly, the invention relates to systems that monitor conditions or parameters in a tire of a vehicle. Specifically, the invention is directed to a system that monitors tire parameters and generates recommendations to a user of the vehicle based upon the monitored parameters.

BACKGROUND OF THE INVENTION

Vehicle tires, and particularly pneumatic tires, typically have certain conditions or parameters that are beneficial to monitor during vehicle operation. For example, monitoring the air pressure and temperature of a pneumatic tire may be helpful in assessing the condition and/or performance of the tire. In addition, measuring or predicting the wear state of the tire, which refers to the loss of material from the tread of the tire as indicated by the depth of the tread, may be beneficial. Information about the wear state of a tire may useful in predicting tire performance during vehicle braking and/or handling, and is often used to determine when a tire should be replaced.

Another parameter that is often monitored or predicted is the wear rate of the tire, which is the wear of the tire over time, and may be useful in estimating tread depth as a function of time for predictions of tire performance and/or tire life. All of these parameters may be coordinated with tire identification information, which enables correlation of the measured or predicted data with a specific tire.

Techniques have been developed to directly measure parameters such as tire pressure, temperature and wear state using sensors that are attached to the tire. Indirect techniques have also been developed, which take certain tire and/or vehicle sensor measurements into account and then generate a prediction or estimate of tire state and/or tire wear rate.

Direct techniques include certain advantages, such as relative simplicity in the approach of measurement of pressure, temperature and/or tread depth with a sensor. Direct techniques also include challenges, such as proper sensor mounting without affecting tire integrity, sensor life and/or transmission of sensor data in the harsh environment of a tire. Due to such challenges, indirect techniques have been developed. While indirect techniques do not necessarily encounter the challenges of sensor mounting, sensor life and/or transmission of sensor data, they include challenges such as complex calculations or processes to ensure accuracy in the estimation or prediction that is generated.

Whether direct or indirect techniques are employed, the tire pressure, temperature, wear state and wear rate that is measured or estimated may be correlated to a specific tire with tire identification information and transmitted to an electronic control system of the vehicle. The data is then employed to improve the function of vehicle systems, such as an anti-lock brake system (ABS), electronic stability control system (ECS), and the like.

In the prior art, while systems have employed such tire data in vehicle control systems, they have not provided comprehensive feedback to a user of the vehicle. It is desirable for a user to be informed of the pressure, temperature, wear state and wear rate for each specific tire to make informed decisions about the tires. In addition, it is desirable for information to be provided to a user that is based upon comprehensive and reliable data models, and which is presented in an easy-to-use format.

As a result, there is a need in the art for a system and method that monitors tire parameters, analyzes the monitored information and generates recommendations to a user of the vehicle based upon the analysis in a convenient and reliable manner.

SUMMARY OF THE INVENTION

According to an aspect of an exemplary embodiment of the invention, a tire data information system is provided. The system includes at least one tire supporting a vehicle and a processor. At least one sensor is mounted on the tire and is in electronic communication with the processor. The at least one sensor measures a temperature and a pressure of the at least one tire. A memory for storing tire identification information is in electronic communication with the processor. Tire wear state means generate at least one of a measurement and an estimate of a wear state of the at least one tire, and the tire wear state means are in electronic communication with the processor. Tire wear rate estimation means generate an estimate of a wear rate of the least one tire, and the tire wear rate estimation means are in electronic communication with the processor. Transmission means transmit the temperature, the pressure, the identification information, the at least one of a measurement and an estimate of a wear state, and the wear rate estimation of the at least one tire to a display device that is accessible to a user of the vehicle. The display device includes indicators for showing the temperature, the pressure, the identification information, the at least one of a measurement and an estimate of a wear state, and the wear rate estimation of the at least one tire to the user.

BRIEF DESCRIPTION OF THE DRAWINGS

The invention will be described by way of example and with reference to the accompanying drawings, in which:

FIG. 7*c* is a schematic representation of still another stage of the third display for a user of the exemplary embodiment of the tire data information system of the present invention.

Similar numerals refer to similar parts throughout the drawings.

Definitions

"Axial" and "axially" means lines or directions that are parallel to the axis of rotation of the tire.

"CAN bus" is an abbreviation for controller area network.

"Circumferential" means lines or directions extending along the perimeter of the surface of the annular tread perpendicular to the axial direction.

"Equatorial centerplane (CP)" means the plane perpendicular to the tire's axis of rotation and passing through the center of the tread.

"Footprint" means the contact patch or area of contact created by the tire tread with a flat surface as the tire rotates or rolls.

"Inboard side" means the side of the tire nearest the vehicle when the tire is mounted on a wheel and the wheel is mounted on the vehicle.

"Lateral" means an axial direction.

"Outboard side" means the side of the tire farthest away from the vehicle when the tire is mounted on a wheel and the wheel is mounted on the vehicle.

"Piezoelectric film sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread element" or "traction element" means a rib or a block element defined by a shape having adjacent grooves.

DETAILED DESCRIPTION OF THE INVENTION

Figure 1:
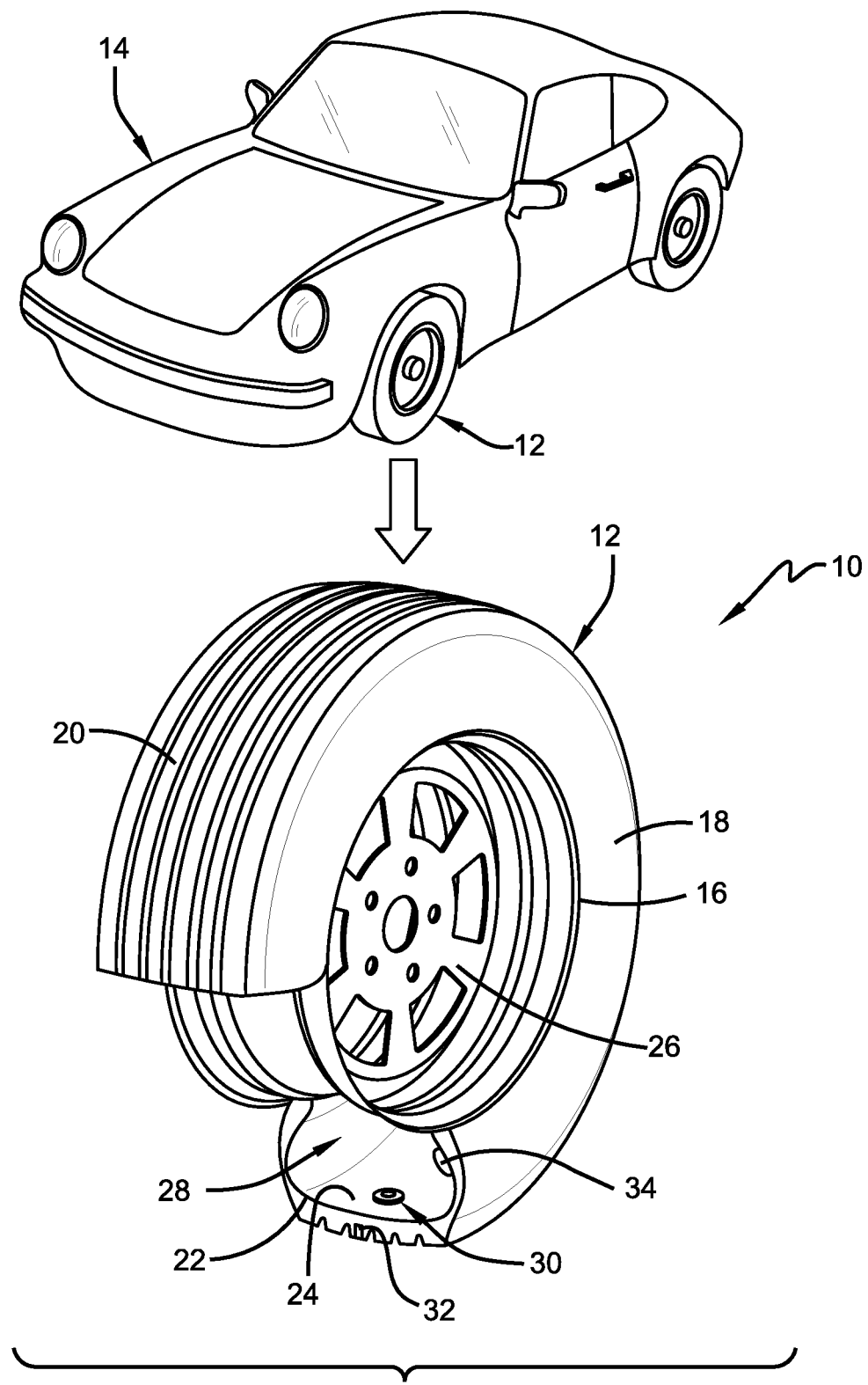
FIG. 1 is a schematic perspective view of a vehicle and sensor-equipped tire of an exemplary embodiment of the tire data information system of the present invention.

Turning now to FIGS. 1 through 8, an exemplary embodiment of the tire data information system of the present invention is indicated at 10. With particular reference to FIG. 1, the system 10 monitors parameters of each tire 12 supporting a vehicle 14. While the vehicle 14 is depicted as a passenger car, the invention is not to be so restricted. The principles of the invention find application in other vehicle categories such as commercial trucks, off-the-road vehicles, and the like, in which vehicles may be supported by more or fewer tires.

Each tire 12 includes a pair of bead areas 16 (only one shown) and a bead core (not shown) embedded in each bead area. Each one of a pair of sidewalls 18 (only one shown) extends radially outward from a respective bead area 16 to a ground-contacting tread 20. The tire 12 is reinforced by a carcass 22 that toroidally extends from one bead area 16 to the other bead area, as known to those skilled in the art. An innerliner 24 is formed on the inside surface of the carcass 22. The tire 12 is mounted on a wheel 26 in a manner known to those skilled in the art and, when mounted, forms an internal cavity 28 that is filled with a pressurized fluid, such as air.

A sensor unit 30 may be attached to the innerliner 24 of each tire 12 by means such as an adhesive and measures certain parameters or conditions of the tire 12, as will be described in greater detail below. It is to be understood that the sensor unit 30 may be attached in such a manner, or to other components of the tire 12, such as between layers of the carcass 22, on or in one of the sidewalls 18, on or in the tread 20, and/or a combination thereof. For the purpose of convenience, reference herein shall be made to mounting of the sensor unit 30 on the tire 12, with the understanding that such mounting includes all such attachment.

The sensor unit 30 is mounted on each tire 12 for the purpose of detecting certain real-time tire parameters, such as tire pressure and temperature. Preferably the sensor unit 30 is a tire pressure monitoring system (TPMS) module or sensor, of a type that is commercially available, and may be of any known configuration. For the purpose of convenience, the sensor unit 30 shall be referred to as a TPMS sensor. Each TPMS sensor 30 preferably also includes electronic memory capacity for storing identification (ID) information for each tire 12, known as tire ID information. Alternatively, tire ID information may be included in another sensor unit, or in a separate tire ID storage medium, such as a tire ID tag 34.

The tire ID information may include manufacturing information for the tire 12, such as: the tire type; tire model; size information, such as rim size, width, and outer diameter; manufacturing location; manufacturing date; a treadcap code that includes or correlates to a compound identification; and a mold code that includes or correlates to a tread structure identification. The tire ID information may also include a service history or other information to identify specific features and parameters of each tire 12, as well as mechanical characteristics of the tire, such as cornering parameters, spring rate, load-inflation relationship, and the like. Such tire identification enables correlation of the measured tire parameters and the specific tire 12 to provide local or central tracking of the tire, its current condition, and/or its condition over time. In addition, global positioning system (GPS) capability may be included in the TPMS sensor 30 and/or the tire ID tag 34 to provide location tracking of the tire 12 during transport and/or location tracking of the vehicle 14 on which the tire is installed.

In addition, a tread wear sensor 32 may be attached to or embedded in the tread 20 to measure the depth of the tread, and thus the wear state of the tire 12. The tread wear sensor 32 may be of any known configuration. For example, the tread wear sensor 32 may include a plurality of radially-stacked resistor elements. As the tread 20 wears, the resistor elements wear away, changing the resistance of the tread wear sensor 32. The change in resistance of the sensor 32 as the resistor elements wear away is correlated to the depth of the tread 20, and thus indicates the wear state of the tire 12. Other types of electronic tread wear sensors 32 include capacitance-based sensors, optical sensors, acoustic sensors, and the like.

It is to be understood that the TMPS sensor 30, the tread wear sensor 32 and the tire ID tag 34 may be separate units, may be incorporated into a single sensor unit, or may be incorporated into multiple units. In addition, other sensors known to those skilled in the art may be employed in the tire 14 as integrated or separate units. For the purpose of convenience, reference shall be made to the TMPS sensor 30, the tread wear sensor 32 and the tire ID tag 34 as separate units, with the understanding that they may be incorporated into one or more integrated units, and that other sensors may be employed.

Figure 2:
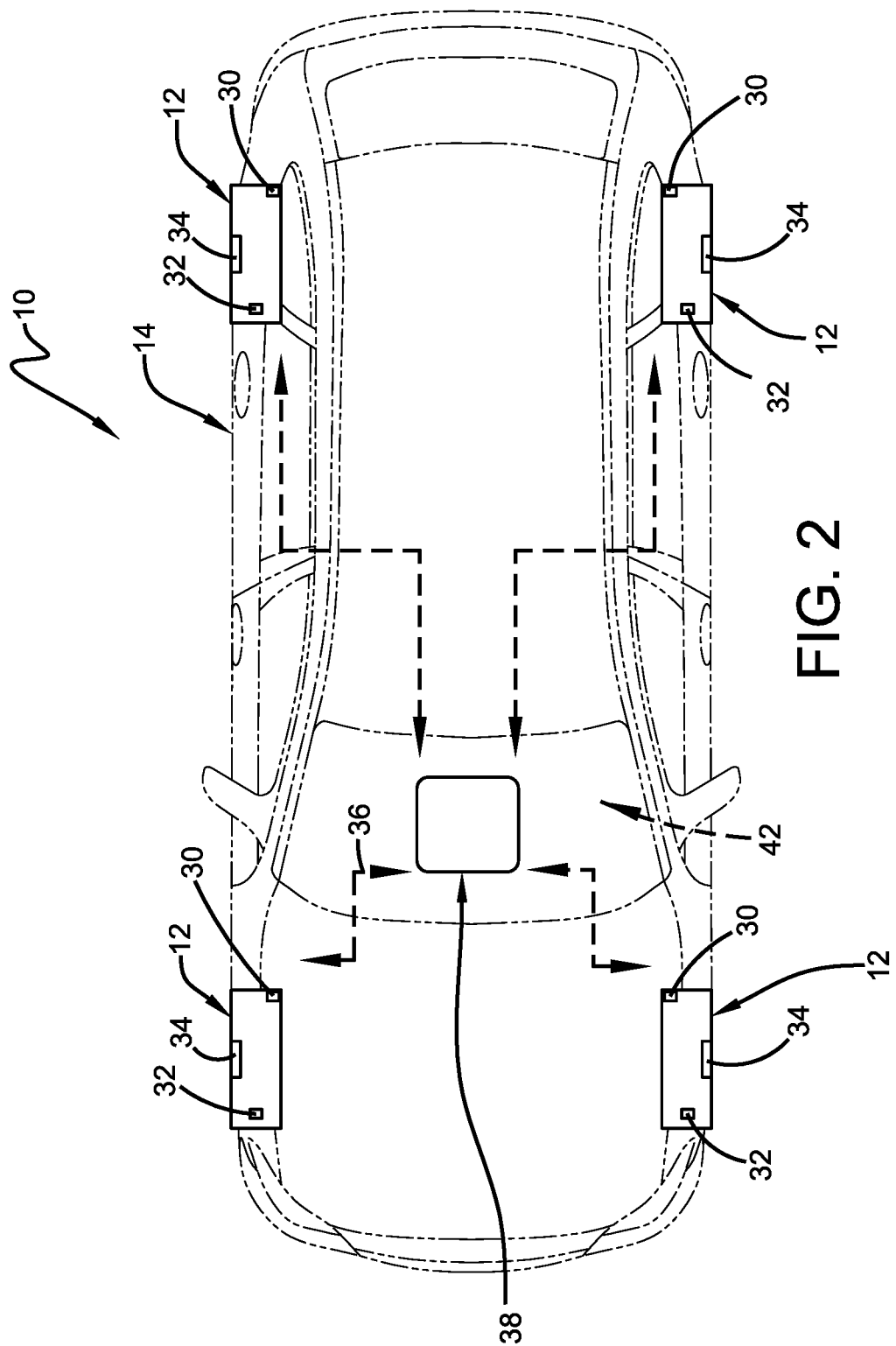
FIG. 2 is a schematic plan view of the vehicle shown in FIG. 1.

Turning now to FIG. 2, the TMPS sensor 30, the tread wear sensor 32 and the tire ID tag 34 each include an antenna for wirelessly transmission 36 of the measured parameters of tire pressure, tire temperature and tire wear, as well as tire ID data, to a processor 38. The processor 38 may be a remote processor mounted on the vehicle 14 as shown, or may be integrated into the TPMS sensor 30 or the tread wear sensor 32. For the purpose of convenience, the processor 38 will be described as a remote processor mounted on the vehicle 14, with the understanding that the processor may alternatively be integrated into the TPMS sensor 30 or the tread wear sensor 32. Preferably, the processor 38 is in electronic communication with or integrated into an electronic system of the vehicle 14, such as the vehicle CAN bus system 42, which is referred to as the CAN bus.

Aspects of the tire data information system 10 preferably are executed on the processor 38 or another processor that is accessible through the vehicle CAN bus 42, which enables input of data from the TMPS sensor 30, the tread wear sensor 32 and the tire ID tag 34, as well as input of data from sensors that are mounted on the vehicle and which are in electronic communication with the CAN bus. For example, vehicle-mounted or vehicle-based sensors include sensors that indicate the vehicle steering wheel angle, yaw rate, brake pedal position, gas pedal position, speed, load, lateral acceleration, longitudinal acceleration, odometer reading, and the like.

In addition, sensors may be mounted on the wheel 26 (FIG. 1) to indicate the wheel longitudinal acceleration, vertical acceleration and/or speed. The wheel-based sensors may be in communication with the CAN bus 42 and the processor 38 to enable input of such wheel-based data. Moreover, the processor 38, or other processor that executes aspects of the tire data information system 10, may in electronic communication with a lookup table or a database that stores tire and vehicle data in a suitable storage medium in electronic communication with the CAN bus 42.

Such use of the processor 38 and the CAN bus 42 enables input and processing of data from the tire-based sensors 30 and 32, tire ID information, vehicle-based sensors, wheel-based sensors and stored data. When a tread wear sensor 32 is not employed, the data that is input into the processor 38 enables indirect estimation of the wear state of the tire 12. In addition, the data that is input into the processor 38 enables indirect estimation of the wear rate of the tire 12. Exemplary tire wear state and wear rate estimation systems and methods are disclosed in published U.S. Patent Application No. 2018/0272813 and U.S. application Ser. No. 16/012,058, which are owned by the same Assignee as the instant Application, The Goodyear Tire & Rubber Company, and which are incorporated herein by reference.

In this manner, the tire data information system 10 enables direct measurement of tire pressure and temperature with the TPMS sensor 30, which is transmitted to the processor 38. Tire ID information is transmitted from the tire ID tag 34 to the processor 38. The tire wear state may be directly measured with the tread wear sensor 32, or may be indirectly estimated as described above, and transmitted or input into the processor 38. The tire wear rate is indirectly estimated based upon tire-based, wheel-based and/or vehicle-based data as described above, and is input into the processor 38.

The processor 38 may execute all of the above functions, or through electronic communication with the CAN-bus 42, may utilize other processors on or in electronic communication with the vehicle 14. In addition, when the tire pressure, temperature, ID information, wear state and wear rate are correlated for each tire 12, the processor 38 may communicate the data to control systems on the vehicle 14 to improve the functioning of an anti-lock brake system (ABS), electronic stability control system (ECS), and the like.

Figure 3:
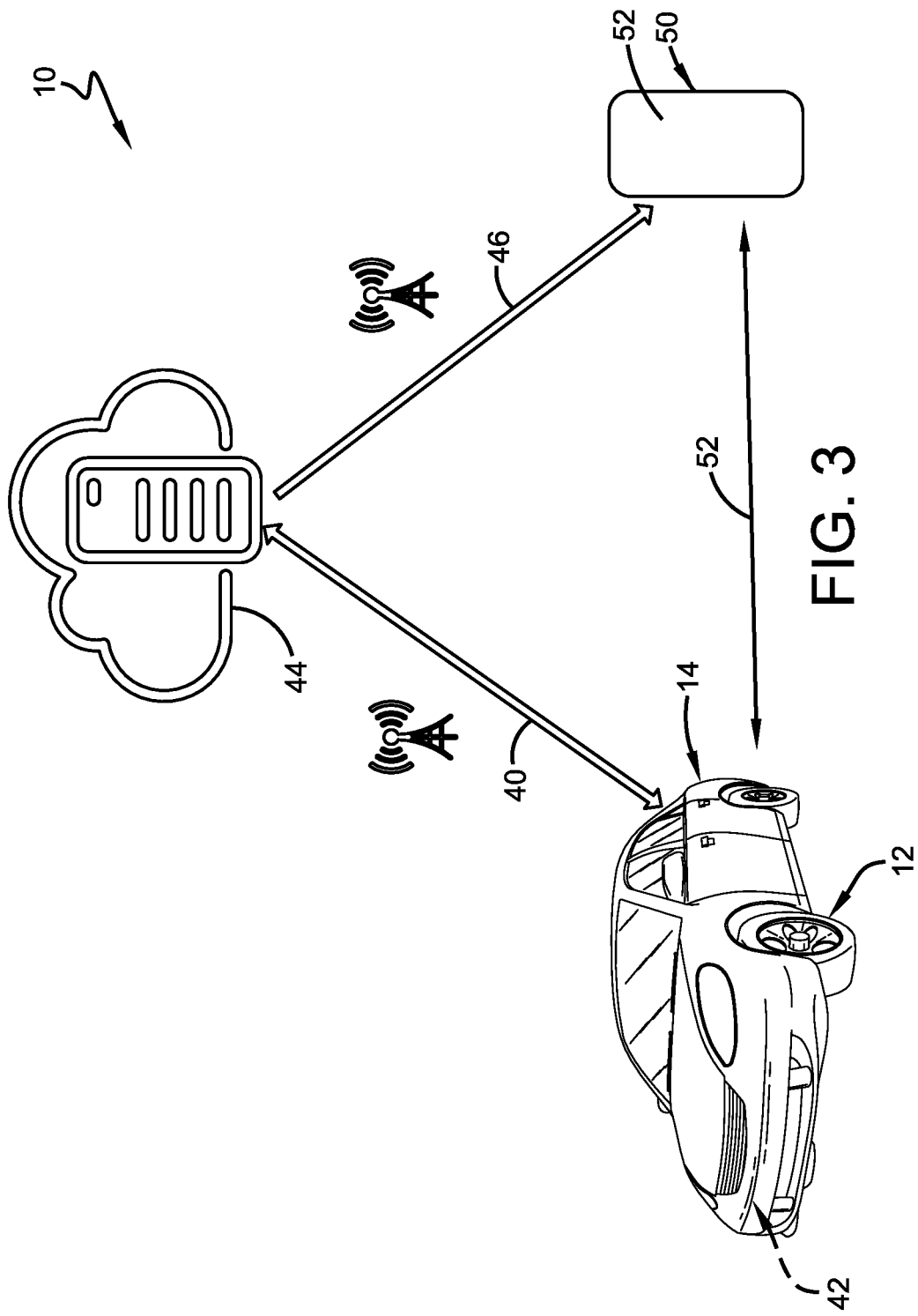
FIG. 3 is a schematic perspective view of the vehicle shown in FIG. 1 with a representation of data transmission to a cloud-based server and to a user device.
Figure 4:
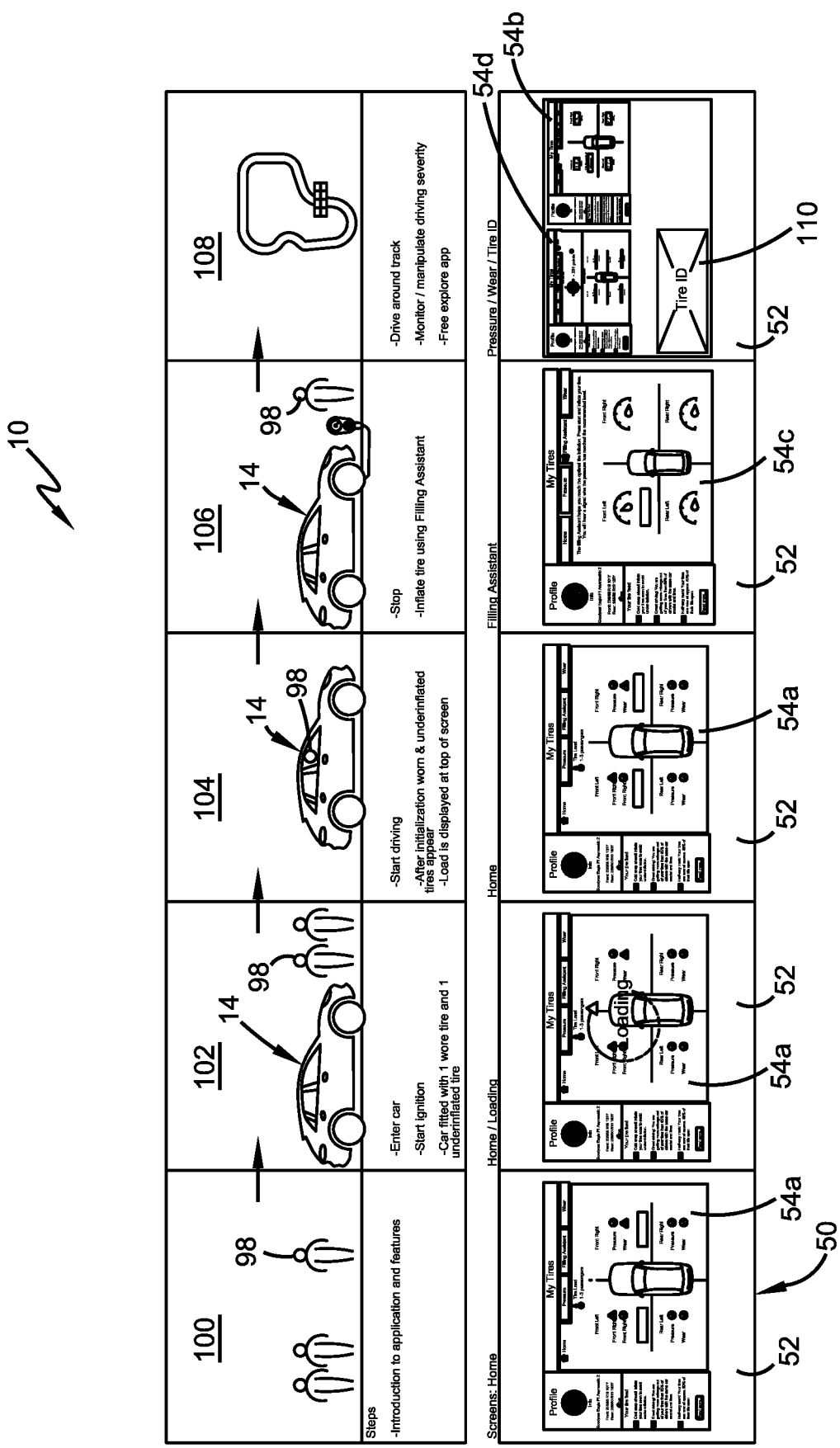
FIG. 4 is a schematic representation of aspects of a display device of the exemplary embodiment of the tire data information system of the present invention.

Referring to FIG. 3, when the tire pressure, temperature, ID information, wear state and wear rate are correlated for each tire 12, the data may be wirelessly transmitted 40 from the processor 38 (FIG. 2) and/or the CAN-bus 42 on the vehicle 14 to a remote processor, such as a processor in a cloud-based server 44. The tire pressure, temperature, ID information, wear state and wear rate data may be stored and/or remotely analyzed, and are also wirelessly transmitted 46 to a display device 50 for a display that is accessible to a user of the vehicle 14, such as a smartphone. Alternatively, the tire pressure, temperature, ID information, wear state and wear rate data may be wirelessly transmitted 52 from the processor 38 and/or the CAN-bus 42 directly to the display device 50.

Turning to FIGS. 4 through 8, information provided by the tire data information system 10 to the vehicle user on the display device 50 is shown. The display device 50 includes a screen 52 that shows the tire pressure, temperature, ID information, wear state and wear rate as correlated for each tire 12 on specific displays 54. The tire pressure, temperature, ID information, wear state and wear rate may be compared to predetermined acceptable ranges for each parameter, and specific indicators then displayed for parameters which are inside of the acceptable ranges and for parameters that are outside of the acceptable ranges, as will be described below.

Figure 5:
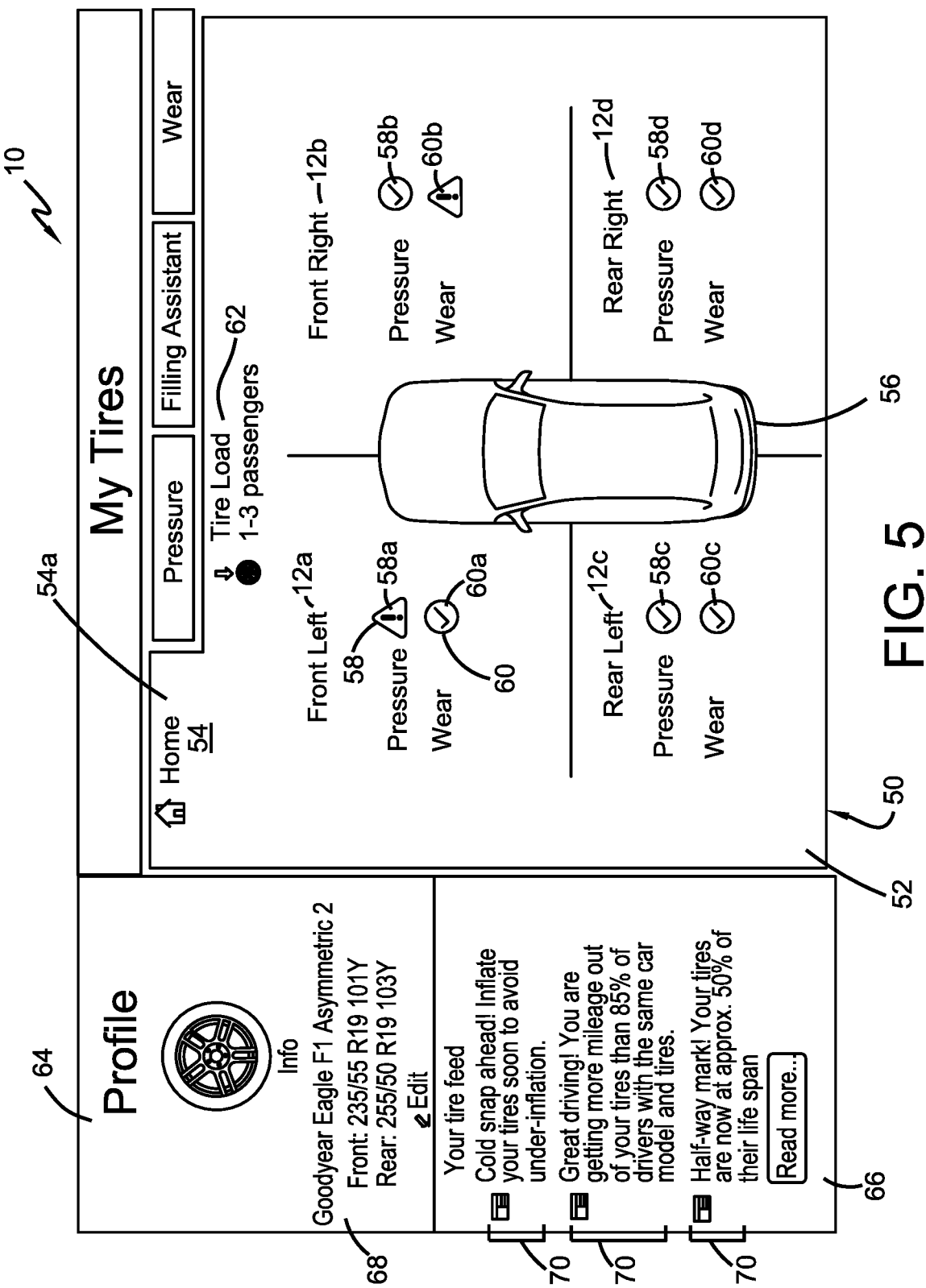
FIG. 5 is a schematic representation of a first display for a user of the exemplary embodiment of the tire data information system of the present invention.

More particularly, as shown in FIG. 5, a home screen or display 54a preferably shows an image 56 of the vehicle 14. The home screen or display 54a includes a visual indication or indicator of pressure 58 in each respective tire 12 and a visual indication or indicator of a wear state 60 of each tire. The position of a front left tire 12a is known through the tire ID information, and a pressure indicator 58a and a wear indicator 60a for the front left tire are shown on the front left position of the vehicle image 56. The position of a front right tire 12b is known through the tire ID information, and a pressure indicator 58b and a wear indicator 60b for the front right tire are shown on the front right position of the vehicle image 56.

The position of a rear left tire 12c is known through the tire ID information, and a pressure indicator 58c and a wear indicator 60c for the rear left tire are shown on the rear left position of the vehicle image 56. The position of a rear right tire 12d is known through the tire ID information, and a pressure indicator 58d and a wear indicator 60d for the rear right tire are shown on the rear right position of the vehicle image 56. Preferably, each pressure indicator 58 and each wear indicator 60 is an easy-to-read status flag. For example, a green check mark may be shown for a respective pressure or wear level that is in acceptable range, such as front right pressure indicator 58b and front left wear indicator 60a, and a red exclamation point shown for a respective pressure or wear level that is outside of an acceptable range, such as front left pressure indicator 58a and front right wear indicator 60b.

The home screen or display 54a may also show a tire load estimation 62. The tire load estimation 62 may be calculated using a known tire load estimation technique, which may incorporate tire-based, wheel-based and/or vehicle-based sensor data that is input into the processor 38 (FIG. 2) in a manner similar to that as described above. Exemplary tire load estimation techniques are disclosed in U.S. Pat. No. 9,222,854 and published U.S. Patent Application No. 2016/0129737, which are owned by the same Assignee as the instant Application, The Goodyear Tire & Rubber Company, and which are incorporated herein by reference. The resulting tire load estimation 62 is then indicated in a convenient manner for a user on the home screen or display 54a.

A portion of the home screen or display 54a may include a profile display 64 and/or a current notice display 66. More particularly, the profile display 64 shows specific tire brand, model and size information 68 as indicated by the tire ID information. The notice display 66 includes notifications 70 that may be predetermined based upon driving conditions, or which are downloaded to the display device 52 from the remote server 44 (FIG. 3) based upon weather conditions or other information.

Figure 6:
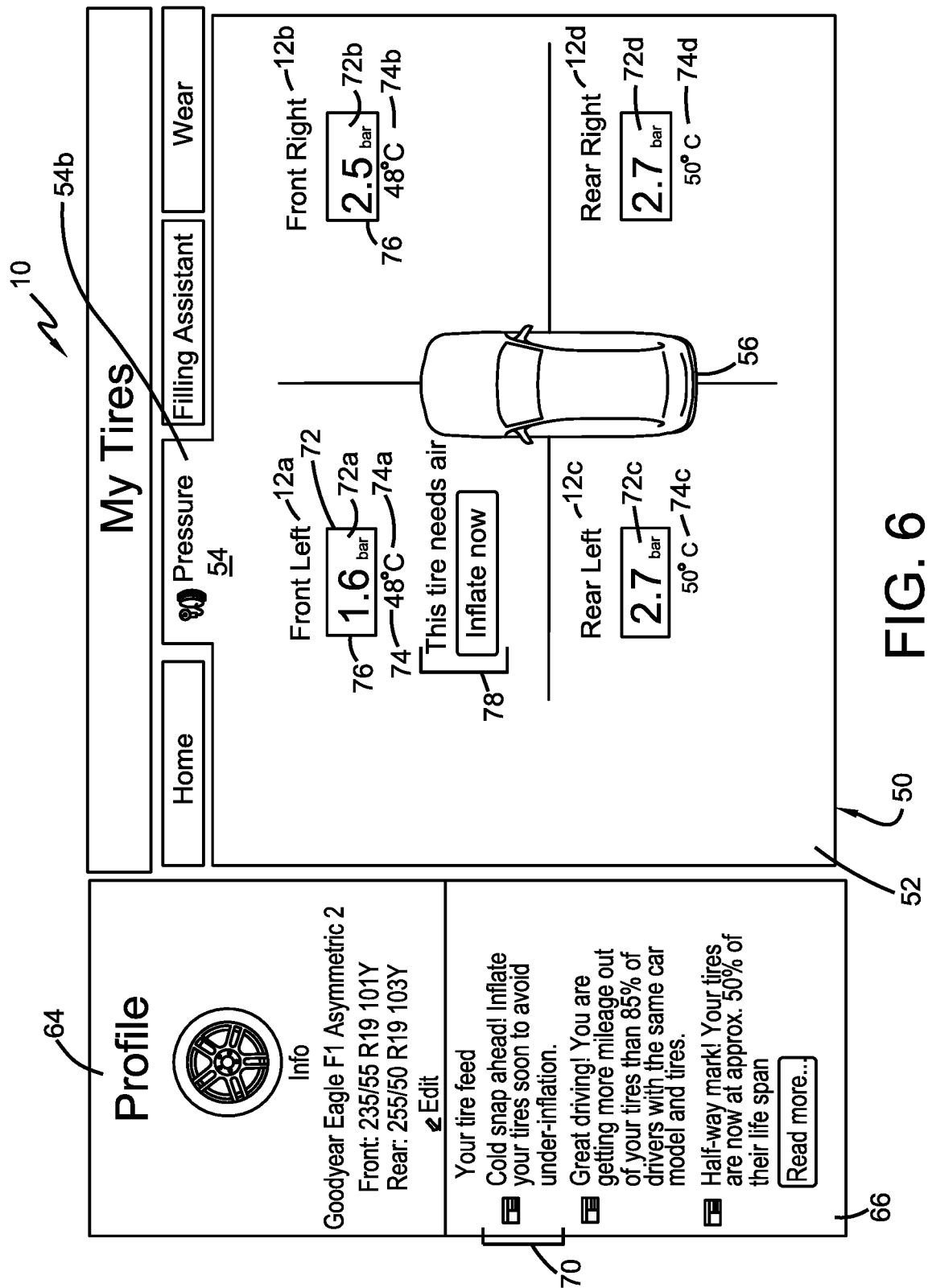
FIG. 6 is a schematic representation of a second display for a user of the exemplary embodiment of the tire data information system of the present invention.

As shown in FIG. 6, a pressure indication screen or display 54b preferably shows an image 56 of the vehicle 14. The pressure indication screen or display 54b also includes a real-time display of the current pressure level and temperature of each respective tire 12 as measured by the TPMS sensor 30. More particularly, the position of the front left tire 12a is known through the tire ID information, and a real-time pressure display 72a and a real-time temperature display 74a for the front left tire are shown on the front left position of the vehicle image 56. The position of the front right tire 12b is known through the tire ID information, and a real-time pressure display 72b and a real-time temperature display 74b for the front right tire are shown on the front right position of the vehicle image 56.

The position of the rear left tire 12c is known through the tire ID information, and a real-time pressure display 72c and a real-time temperature display 74c for the rear left tire are shown on the rear left position of the vehicle image 56. The position of the rear right tire 12d is known through the tire ID information, and a real-time pressure display 72d and a real-time temperature display 74d for the rear right tire are shown on the rear right position of the vehicle image 56.

As an optional feature, each pressure display 72 may include a border 76 that provides a readily viewable status when compared to a predetermined pressure level. For example, when the pressure level is at or above an acceptable predetermined level, the border 76 may be green, such as front right pressure display 72b. When the pressure level is below an acceptable predetermined level, the border 76 may be red, such as front left pressure display 72a. In addition, when any pressure display 72 is significantly below a predetermined level, an inflation notification 78 preferably is displayed. For example, when the pressure display 72a for the front left tire 12a indicates a pressure that is significantly below the predetermined level, the inflation notification 78 is displayed adjacent the display for the front left tire.

A portion of the pressure indication screen or display 54b may include the profile display 64 and/or the current notice display 66. Among the notifications 70 in the notice display 66 may be a pressure-inflation specific notification, such as a reminder to inflate the tires 12 based on weather condition information as downloaded to the display device 50 from the remote server 44.

Figure 7A:
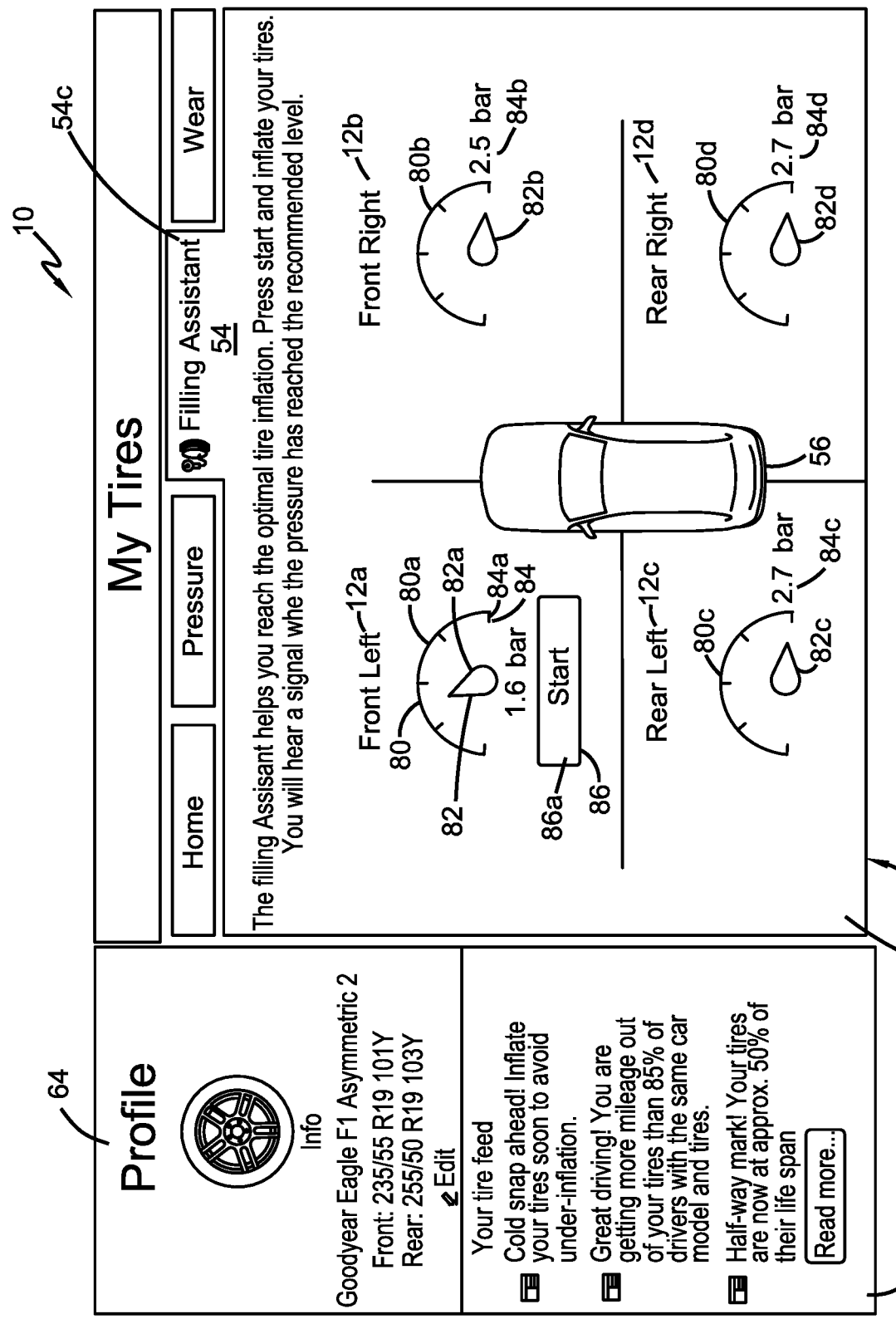
FIG. 7*a* is a schematic representation of a stage of a third display for a user of the exemplary embodiment of the tire data information system of the present invention.
Figure 7B:
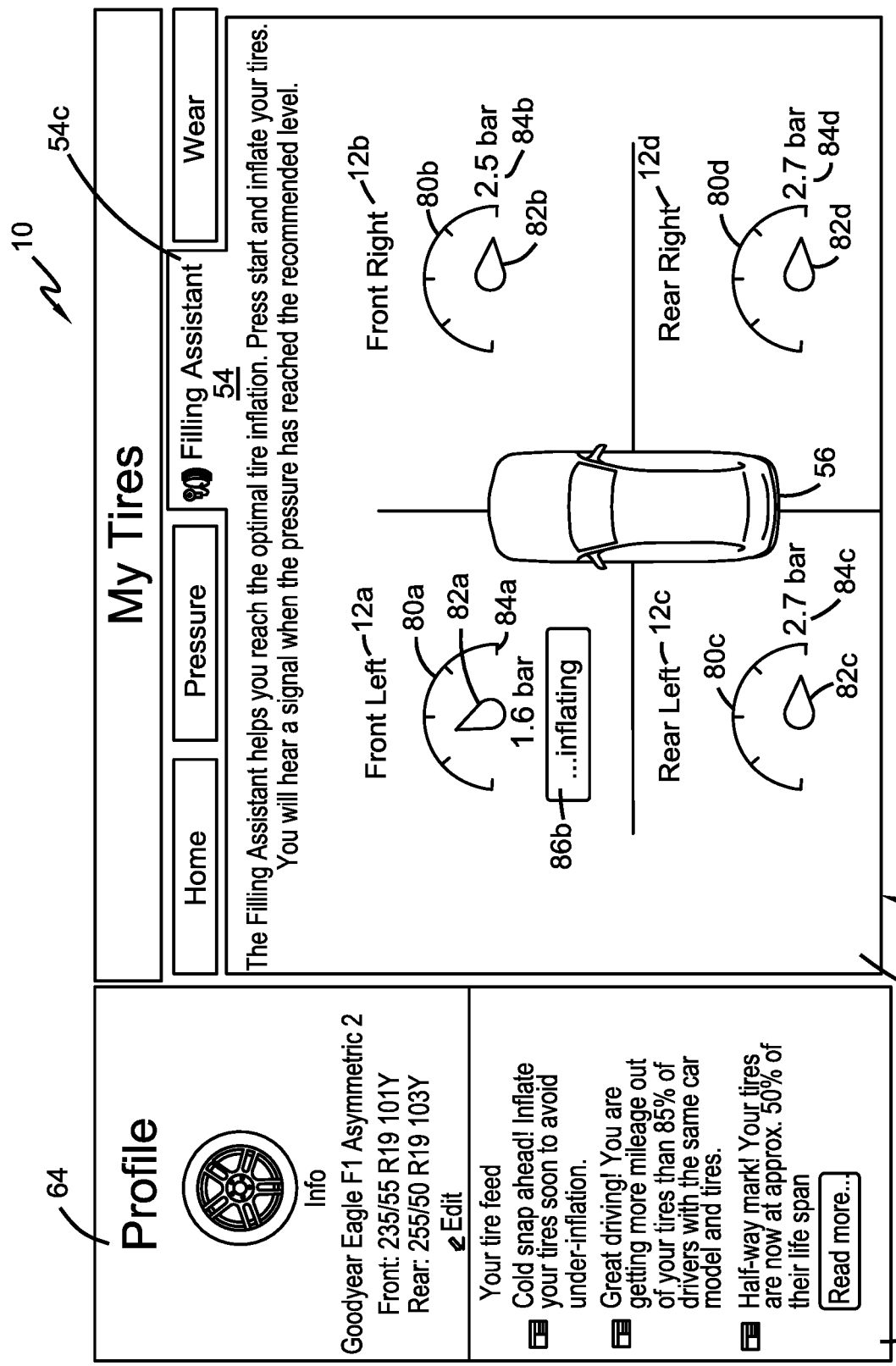
FIG. 7*b* is a schematic representation of another stage of the third display for a user of the exemplary embodiment of the tire data information system of the present invention.
Figure 7C:
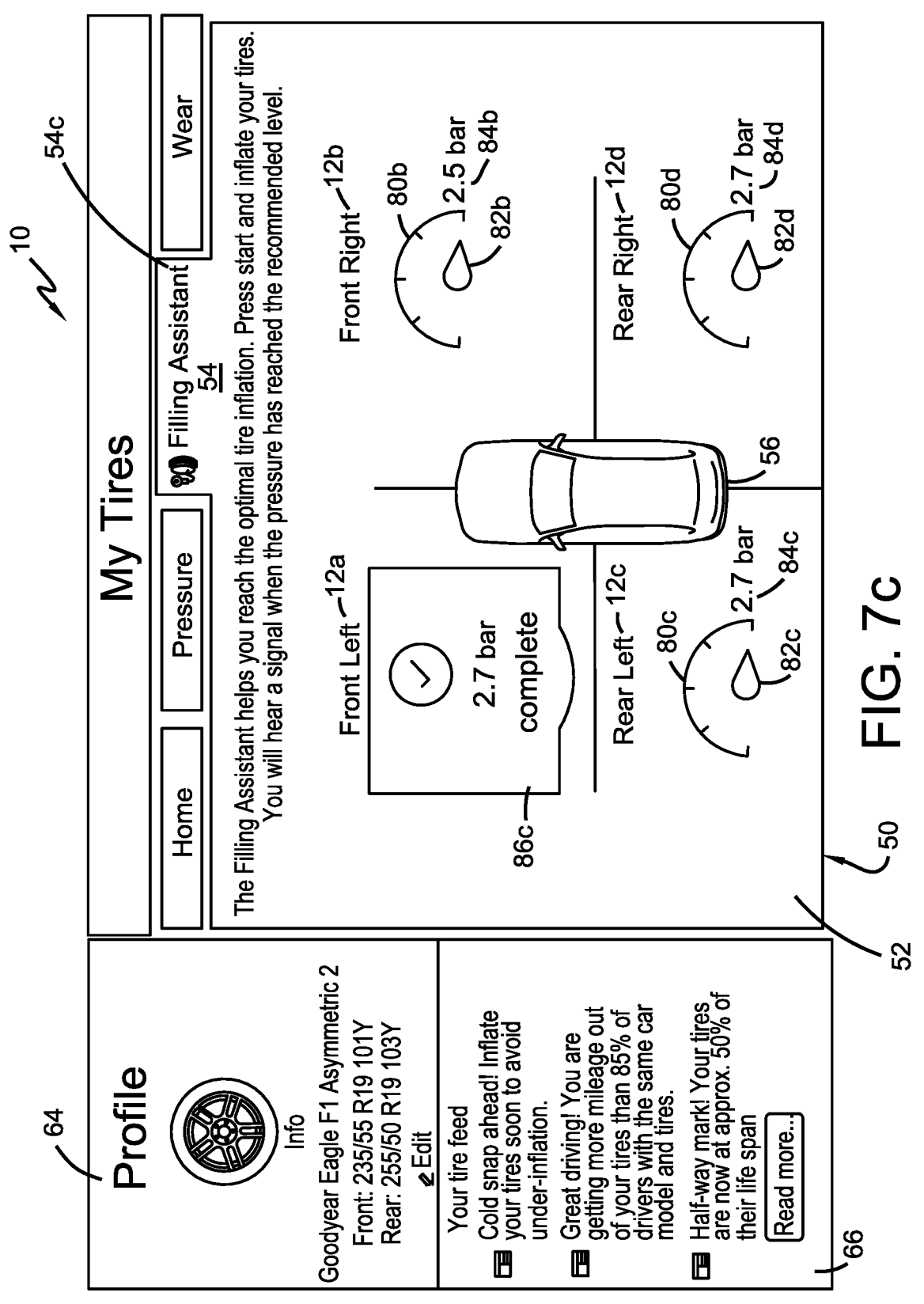

Turning to FIGS. 7a through 7c, a filling assistant screen or display 54c preferably shows an image 56 of the vehicle 14. The filling assistant screen or display 54c also includes a gauge 80 showing the current pressure level 82 of each respective tire 12 as measured by the TPMS sensor 30 relative to a predetermined optimum pressure level 84. More particularly, the position of the front left tire 12a is known through the tire ID information, and a pressure gauge 80a showing the current pressure level 82a in the front left tire is shown relative to the optimum pressure level 84a on the front left position of the vehicle image 56. The position of the front right tire 12b is known through the tire ID information, and a pressure gauge 80b showing the current pressure level 82b in the front right tire is shown relative to the optimum pressure level 84b on the front right position of the vehicle image 56.

The position of a rear left tire 12c is known through the tire ID information, and a pressure gauge 80c showing the current pressure level 82c in the rear left tire is shown relative to the optimum pressure level 84c on the rear left position of the vehicle image 56. The position of a rear right tire 12d is known through the tire ID information, and a pressure gauge 80d showing the current pressure level 82d in the rear right tire is shown relative to the optimum pressure level 84d on the rear right position of the vehicle image 56.

Preferably, each pressure gauge 80 includes a visual indicator that reinforces the status of the current pressure level 82 when compared to the optimum predetermined pressure level 84. For example, when the current pressure level 82 is at the optimum predetermined pressure level 84, a portion of the gauge 80 is green, such as the front right gauge 80b. When the current pressure level 82 is below the optimum predetermined pressure level 84, a portion of the gauge 80 is yellow or red, such as the front left gauge 80a.

In order to communicate the status of the tire pressure during filling of each tire 12 with compressed air, the filling assistant screen or display 54c includes a status indicator 86 adjacent the gauge 80 of a tire that needs to be filled. For example, when the current pressure level 82a of the front left tire 12a is below the optimum predetermined pressure level 84a, the status indicator 86 is displayed adjacent the gauge 80a for that tire. When inflation is ready to commence, the status indicator 86 displays a "start" status 86a as shown in FIG. 7a.

As inflation of the tire 12a occurs, the status indicator 86 displays an "inflating" status 86b as shown in FIG. 7b. Once the current pressure level 82a in the tire 12a reaches the optimum predetermined pressure level 84a, the status indicator 86 displays a "complete" status 86c, which may include optional additional indicators, such as a green color and a check mark. In this manner, the status indicator 86 clearly informs a user of the current pressure level 82 during inflation of each respective tire 12, and informs the user when the pressure level reaches the optimum predetermined pressure level 84. Optionally, a portion of the filling assistant screen or display 54c may include the profile display 64 and/or the current notice display 66.

Figure 8:
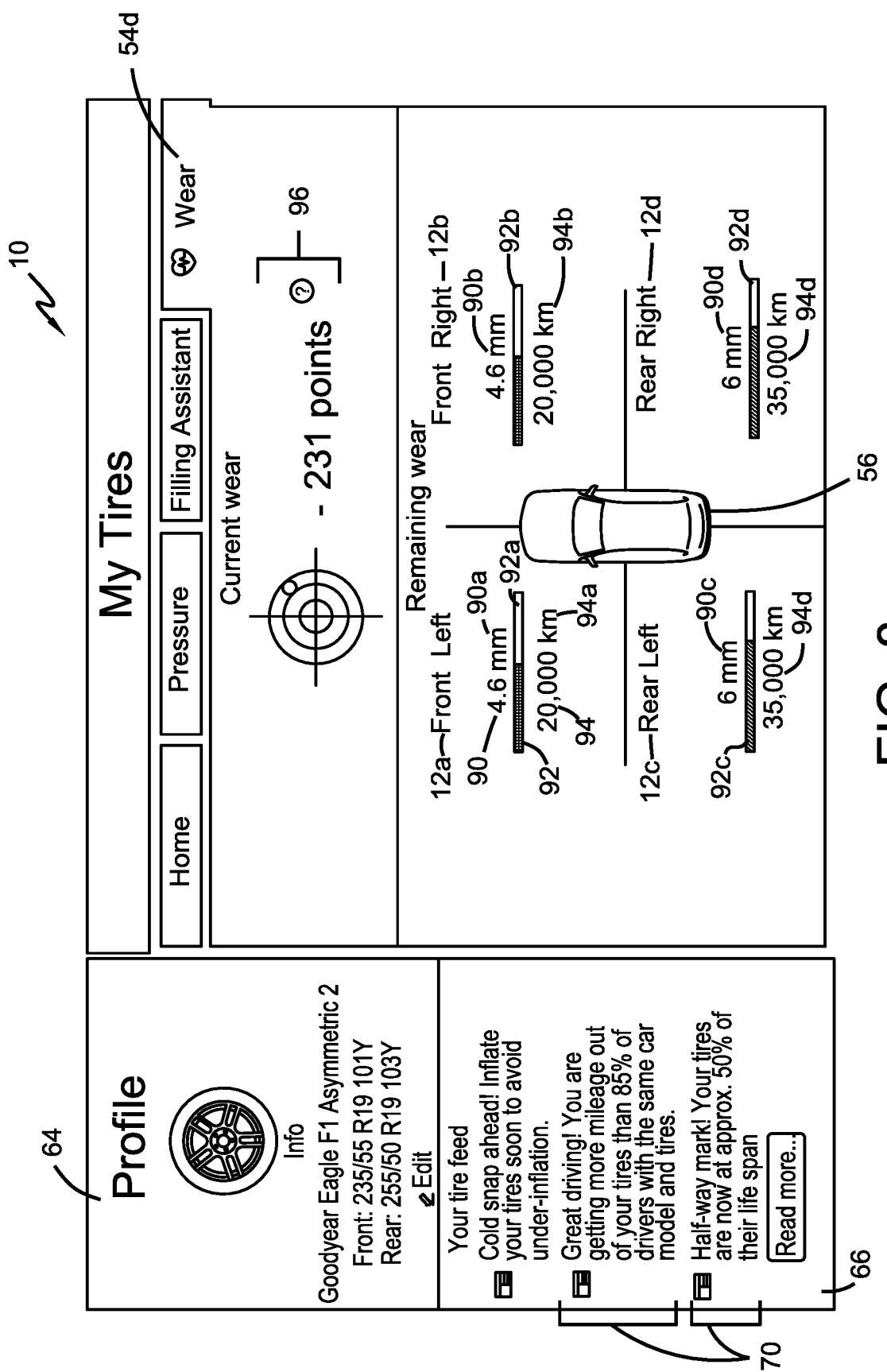
FIG. 8 is a schematic representation of a fourth display for a user of the exemplary embodiment of the tire data information system of the present invention.

Referring to FIG. 8, a wear indication screen or display 54d preferably shows an image 56 of the vehicle 14. The wear indication screen 54d also includes an indicator showing the current wear state or tread depth 90 of each respective tire 12 as determined by the wear sensor 32 and/or an indirect wear state estimation, as described above. An estimated wear rate of each tire 12 is shown by a wear rate indicator 92 relative to a rated kilometer or mileage-based life 94 of the tire.

More particularly, as the position of the front left tire 12a is known through the tire ID information, a readout of the current tread depth or wear state 90a of the front left tire is shown, and the wear rate 92a is indicated relative to the rated life 94a of the tire on the front left position of the vehicle image 56. As the position of the front right tire 12b is known through the tire ID information, a readout of the current tread depth or wear state 90b of the front right tire is shown, and the wear rate 92b is indicated relative to the rated life 94b of the tire on the front right position of the vehicle image 56.

As the position of a rear left tire 12c is known through the tire ID information, a readout of the current tread depth or wear state 90c of the rear left tire is shown, and the wear rate 92c is indicated relative to the rated life 94c of the tire on the rear left position of the vehicle image 56. As the position of a rear right tire 12d is known through the tire ID information, a readout of the current tread depth or wear state 90d of the rear right tire is shown, and the wear rate 92d is indicated relative to the rated life 94d of the tire on the rear right position of the vehicle image 56.

Preferably, each wear state or tread depth 90 readout and/or wear rate indicator 92 includes an additional visual indication that alerts a user when the depth of the tread 20 is near or below a predetermined level. For example, when the depth of the tread 20 is well above a predetermined level, the wear state or tread depth readout 90 and/or the wear rate indicator 92 may be green, such as the rear left tire wear state or tread depth readout 90c and the wear rate indicator 92c. When the depth of the tread 20 is near or below a predetermined level, the wear state or tread depth readout 90 and/or the wear rate indicator 92 may be yellow or red, such as the front left wear state or tread depth readout 90a and the wear rate indicator 92a.

In this manner, the wear indication screen or display 54d informs a user of the current wear state and wear rate of each tire 12. As described above, the wear state and wear rate for each tire 12 may be transmitted to a cloud-based server 44, where analysis of similar data among multiple users may take place. Based on such an analysis, the wear indication screen or display 54d may show a wear profile 96 for the tires 12 on the vehicle 14, as well as wear-specific notifications 70 in the current notice display 66. Such notifications may include a comparison of the wear state and/or wear rate of the tires 12 to tires on other vehicles, a notice as to estimated tire life, a replacement notice, and advice as to which tires should be used when replacement occurs.

Returning now to FIG. 4, examples of the displays 54 are shown during operation of the vehicle 14. Using the display device 50, a user 98 may access displays such as the home screen or display 54a before entering the vehicle 14 to observe the status of the tires 12, step 100. Upon activating the vehicle 14, the respective pressure indicators 58 and wear indicators 60 on the home screen or display 54a are updated, step 102. As the user 98 operates or drives the vehicle 14, current status information for the pressure indicators 58, wear indicators 60 and load estimation 62 is displayed on the home screen or display 54a as described above, step 104. When inflation of a tire 12 is needed, the user 98 selects the filling assistant screen or display 54c and follows the above-described indicators, step 106. As the user 98 continues to operate or drive the vehicle 14, the pressure indication screen or display 54b and the wear indication screen or display 54d show respective pressure and wear information for the tires 12 as described above, step 108.

Also available to the user 98 is a tire ID information icon 110, which may be selected to obtain a display of the above-described tire ID information. The tire ID information icon 110 may be useful when the user 98 is selecting new tires and/or is reviewing characteristics of the existing tires 12.

In this manner, the tire data information system 10 of the present invention monitors tire parameters, analyzes the monitored information and generates recommendations for a user 98 of a vehicle 14 based upon the analysis in a convenient and reliable manner. In addition to providing helpful and convenient information to the user 98 of the vehicle 14, the data from the tire data information system 10 may be used to provide information for central evaluation of the tires 12 and to improve replacement tire availability.

The present invention also includes a method of providing tire information to a vehicle user. The method includes steps in accordance with the description that is presented above and shown in FIGS. 1 through 8.

It is to be understood that the structure and method of the above-described tire data information system may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire data information system comprising:
 at least one tire supporting a vehicle;
 a processor,
 at least one sensor mounted on the tire and in electronic communication with the processor, the at least one sensor measuring a temperature and a pressure of the at least one tire;
 a memory for storing tire identification information, the memory being in electronic communication with the processor;
 tire wear state means for generating at least one of a measurement and an estimate of a wear state of the at least one tire, the tire wear state means being in electronic communication with the processor;
 tire wear rate estimation means for generating an estimate of a wear rate of the least one tire, the tire wear rate estimation means being in electronic communication with the processor;
 transmission means for transmitting the temperature, the pressure, the identification information, the at least one of a measurement and an estimate of a wear state, and the wear rate estimation of the at least one tire to a display device accessible to a user of the vehicle; and
 the display device including a temperature indicator, a pressure indicator, an identification information indicator, at least one of a wear state measurement indicator and a wear state estimate indicator, and a wear rate estimate indicator.

2. The tire data information system of claim 1, wherein the tire wear state means includes a wear sensor mounted on the tire that generates a measurement of wear of the at least one tire.

3. The tire data information system of claim 1, wherein the tire wear state means includes a wear estimator that generates an indirect estimation of the wear state of the at least one tire.

4. The tire data information system of claim 1, wherein the processor is in electronic communication with a CAN bus system of the vehicle.

5. The tire data information system of claim 1, wherein the memory is integrated into the at least one sensor.

6. The tire data information system of claim 1, wherein the at least one sensor includes at least one of a tire pressuring monitoring system sensor, a tire ID tag and a tread wear sensor.

7. The tire data information system of claim 1, further comprising at least one sensor being mounted on at least one of the vehicle and a wheel on which the tire is mounted, the at least one vehicle or wheel mounted sensor being in electronic communication with the processor.

8. The tire data information system of claim 1, wherein the transmission means includes wireless transmission from the processor to a remote server and wireless transmission from the remote server to the display device.

9. The tire data information system of claim 8, wherein the display device includes a display screen showing notifications to the user that are downloaded to the display device from the remote server.

10. The tire data information system of claim 1, wherein the transmission means includes wireless transmission from the processor to the display device.

11. The tire data information system of claim 1, wherein the display device includes a display screen showing an image of the vehicle and the pressure indicator for the at least one tire at a position on the vehicle image that corresponds to a position of the at least one tire on the vehicle.

12. The tire data information system of claim 11, wherein the display device includes a display screen showing a status indicator adjacent the pressure indicator when the at least one tire is being inflated.

13. The tire data information system of claim 1, wherein the display device includes a display screen showing an image of the vehicle and the indicator of at least one of a measurement and an estimate of wear state for the at least one tire at a position on the vehicle image that corresponds to a position of the at least one tire on the vehicle.

14. The tire data information system of claim 1, wherein the display device includes a display screen showing an image of the vehicle and the wear rate estimation indicator for the at least one tire at a position on the vehicle image that corresponds to a position of the at least one tire on the vehicle.

15. The tire data information system of claim 14, further comprising a remote server in electronic communication with the processor, wherein at least one of the wear rate estimation and the wear state measurement or estimate is transmitted to the remote server for comparison to tires on other vehicles, and selected information from the comparison is transmitted from the remote server to the display device.

16. The tire data information system of claim 1, wherein the display device includes a display screen showing an image of the vehicle and the temperature indicator for the at least one tire at a position on the vehicle image that corresponds to a position of the at least one tire on the vehicle.

17. The tire data information system of claim 1, wherein the display device includes a display screen showing selected tire identification information for the at least one tire.

18. The tire data information system of claim 1, wherein the display device includes a display screen showing a tire load estimation for the at least one tire.

19. The tire data information system of claim 1, wherein the processor is disposed on the vehicle.

20. The tire data information system of claim 1, wherein the processor is integrated with the at least one sensor.

\* \* \* \* \*